Patented Nov. 24, 1931

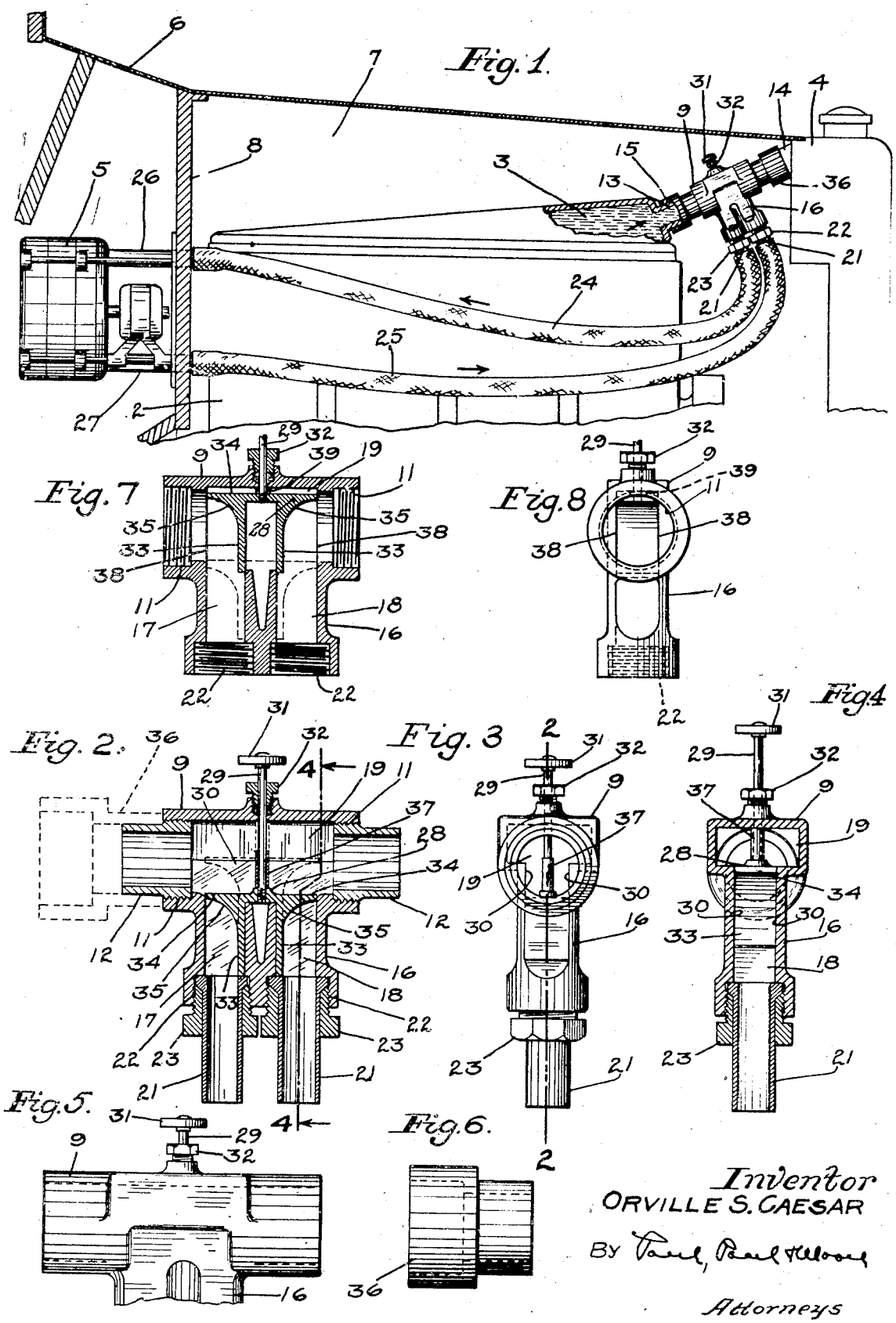

1,833,068

UNITED STATES PATENT OFFICE

ORVILLE S. CAESAR, OF CHICAGO, ILLINOIS, ASSIGNOR TO TROPIC-AIRE, INCORPORATED, OF MINNEAPOLIS, MINNESOTA, A CORPORATION OF MINNESOTA

FLUID CONTROL VALVE

Application filed December 23, 1927. Serial No. 242,272.

This invention relates to an improved fluid control valve adapted for use in connection with a motor-driven vehicle, having a hot-fluid air-heater mounted therein for heating the interior of the vehicle in cold weather, and provides means for diverting a portion of the heated engine cooling-medium through the air-heater and returning it to the engine circulating system.

An object of the invention is to provide such a valve comprising an elongated casing having each end threaded to receive one of a series of different sized bushings, whereby the casing may be connected to the usual discharge of the engine water-jacket and the intake to the radiator without necessitating any alteration in the construction of the casing, and the latter also having a lateral extension provided with ports having means for connecting them to the intake and discharge of the air-heater whereby circulation may be established therethrough, and a member being slidably mounted within the casing and having means exteriorly thereof for moving the member into the main passage through the casing for the purpose of diverting a portion of the engine cooling-medium into one of said ports, from whence it will flow through a conduit to the air-heater and return therefrom through a second conduit to the other of said ports, and will be returned to the engine fluid-cooling system.

A further object of the invention is to provide such a valve having a direct main passage therethrough, the ends of which are adapted for connection respectively with the engine water jacket and the radiator, and the valve also having two lateral ports leading from the main passage and each having means for connection with a hot-fluid air-heater, preferably mounted within the body of the vehicle, and a fluid-diverting member is slidably mounted within the casing and has a stem connected therewith and projecting through a wall of the casing whereby the member may be actuated to move it into and out of the main passage to control the diverting of a portion of the fluid into one of the ports, said member having two opposed curved faces, one functioning to guide a portion of the fluid into one port, and the other functioning to direct the fluid returning from the air-heater in the direction of flow of the fluid through said main passage.

A further object is to provide such a valve of simple and inexpensive construction which may be die cast, thus eliminating substantially all machine work, and providing such a device which may be manufactured at a minimum cost.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification:

Figure 1 is a side elevation of a portion of a motor-driven vehicle showing the invention applied thereto;

Figure 2 is a vertical sectional view on the line 2—2 of Figure 3, showing the general construction of the valve;

Figure 3 is an end view of Figure 2;

Figure 4 is a vertical sectional view on the line 4—4 of Figure 2;

Figure 5 is an elevational view showing the upper portion of the valve casing;

Figure 6 is a view illustrating one of the coupling members used to connect the valve casing to the water jacket and radiator;

Figure 7 is a view showing a modified form wherein the slidable member in the valve casing may be positioned to divert substantially all of the engine-cooling fluid through the air-heater; and Figure 8 is a sectional view on the line 8—8 of Figure 7.

In the selected embodiment of the invention here shown, for purposes of disclosure, there is illustrated a portion of a motor-driven vehicle comprising the conventional internal combustion engine 2, having the usual water jacket 3 and radiator 4. A hot-fluid air-heater 5 is mounted within the forward portion of the vehicle body 6 and is separated from the engine chamber 7 by means of the usual dash 8. The air-heater 5 is shown and described in detail in my pending application, Serial No. 166,544, filed February 7th, 1927.

The novel valve featured in this invention is designed for use to regulate the flow of water through the air-heater 5. The valve comprises a casing 9, preferably having its opposite ends threaded, as indicated at 11, to receive bushings 12. These bushings cooperate with the discharge 13 and intake 14 respectively of the water jacket and radiator, to receive the usual coupling members 15 which secure the valve in proper position between the water jacket and the radiator.

The valve casing 9 has a lateral extension 16 having ports 17 and 18 therein which communicate with the main passage 19 in the casing. Tubular members 21 are secured in threaded sockets 22, provided at the opposite ends of the ports 17 and 18, by means of packing nuts 23. These nuts secure the members 21 in the sockets 22 so that the joints therebetween will be substantially water-tight. Suitable conduits 24 and 25 each have one end secured to one of the tubular members 21 and their opposite ends are secured respectively to the intake 26 and discharge 27 of the air-heater 5.

A member 28 is slidably mounted in the casing 9 and has an operating stem 29 extending through the casing wall as shown in Figure 2. A head 31 is provided upon the stem 29 whereby the slide member 28 may be conveniently operated from the exterior of the casing. This head is preferably rotatable on the stem to prevent accidental unscrewing of the stem from the member 28. A packing nut 32 provides a leak-proof bearing for the stem 29 and also provides means for frictionally holding the stem in its adjusted positions. The slide member 28 is provided with legs 33 which fit into the ports 17 and 18, it being understood that the adjacent walls of the two ports are flat and substantially parallel. The opposed side walls of the casing 9, adjacent the member 28, are depressed inwardly to provide guides 30 for the member extending to the top thereof, when positioned as shown in dotted lines in Figure 2. These guides 30 also cooperate with the member to partially interrupt flow through the main passage when the fluid is being diverted through the air-heater. The upper end of the member 28, when viewed as shown in Figure 2, is provided with outwardly flared end portions 34 which, when the member is in the position shown in Figure 2, will terminally engage the opposite walls of the ports 17 and 18, thus substantially closing them to the entrance of fluid or water from the main passage 19. When the member 28 is moved upwardly to the dotted line position shown in Figure 2, one of the curved faces 35 will intercept the stream of water passing through the passage 19 and will divert a portion thereof into the port 17, which will thereafter flow through the conduit 24 and intake 26 of the air-heater 5, thence through the discharge 27, conduit 25, and back to the main passage 19, through the port 18. The curved face 35 of the side of the slide adjacent to the port 18 will direct the returning fluid towards the radiator, as it is returned to the main passage 19. The flow of water through the air-heater may be controlled from zero to maximum by adjusting the slide 28 by means of the stem 29.

The valve is designed so that it may be generally used for all types and sizes of motor-driven vehicles employing internal combustion engines of the water-cooled type. When it is used in connection with a vehicle having a comparatively large connection between the engine water-jacket and the radiator, special coupling members 36, such as shown in Figure 6 may be employed for connecting the valve to the engine water-jacket and radiator. One of these coupling members is indicated in dotted lines in Figure 2.

A sleeve 37 is preferably provided upon the stem 29 within the main passage 19, to limit the upward movement of the slide member 28. By the provision of this sleeve 37, it will be impossible for an operator to completely shut off the direct circulation between the water-jacket and the radiator, as will readily be seen by reference to Figure 2. When the weather is warm and it becomes unnecessary to use the air-heater for heating the interior of the vehicle, the slide 28 may be moved downwardly to the full line position shown in Figure 2, thus cutting off all fluid flow through the air-heater and permitting direct circulation of the fluid from the water-jacket to the radiator. In the drawings, I have indicated flexible connections between the valve casing 9 and the air-heater. It is to be understood, however, that any suitable connections may be used between these two members as, for instance, metal tubing may be employed in which case the tubular members 21 may be dispensed with, the ends of the copper tubes being fitted directly into the threaded sockets 22 of the lateral extension 16.

When the member 28 is positioned as shown in dotted lines in Figure 2, the water flowing through the main passage 19 and past the port 18, tends to provide an ejector action to further induce circulation through the air-heater, because of the curved face 35 over the port 18, directing the returning fluid in the direction of fluid flow through the casing, or, towards the radiator.

Figures 7 and 8 illustrate a modified form wherein the member 28 may be positioned to divert substantially all of the engine-cooling fluid through the air-heater. This has been found desirable in some installations. In the form here shown, the side guides 38 in the valve casing extend to the top of the main passage 19, as shown in Figure 8, so that when the member 28 is positioned as shown in Figure 7, substantially all of the fluid will be diverted through the air-heater. A sleeve 39 is provided on the stem 29 to limit upward movement of the member.

I claim as my invention:

1. In a motor-driven vehicle having an engine fluid-cooling system including an engine cooling-medium jacket and a radiator, and a hot-fluid air-heater for heating the vehicle, the combination with a casing positioned between the jacket and radiator and having a direct passage therethrough permitting direct flow of cooling-medium from said jacket to said radiator, of lateral ports in said casing, conduits connected with said lateral ports and having their opposite ends connected, respectively, with an intake and a discharge of said air-heater, and a substantially U-shape member slidable in said casing for diverting a portion of heated cooling-medium from said main passage through one of said lateral ports to said air-heater whence said heated cooling-medium will return by way of the other of said lateral ports to said radiator, said U-shape member having legs extending into said lateral ports and engaging walls thereof to provide guides for said member.

2. In a motor-driven vehicle having an engine fluid-cooling system including an engine cooling-medium jacket and a radiator, and a hot-fluid air-heater for heating the vehicle, the combination with a casing positioned between the jacket and radiator and having a direct passage therethrough permitting direct flow of cooling-medium from said jacket to said radiator, of lateral ports in said casing, conduits connected with said lateral ports and having their opposite ends connected, respectively, with an intake and a discharge of said air-heater, and a member laterally slidable in said casing and operable from the exterior thereof to be moved into said direct passage to divert a portion of heated cooling-medium through one of said lateral ports to said air-heater whence said heated cooling-medium will return by way of the other of said lateral ports to said radiator.

3. In a motor-driven vehicle having an engine fluid-cooling system including an engine cooling-medium jacket and a radiator, and a hot-fluid air-heater for heating the vehicle, the combination with a casing positioned between the jacket and radiator and having a direct passage therethrough permitting direct flow of cooling-medium from said jacket to said radiator, of lateral ports in said casing, conduits connected with said lateral ports and having their opposite ends connected, respectively, with an intake and a discharge of said air-heater, and a member laterally slidable in said casing and operable from the exterior thereof to be moved into said direct passage between said jacket and radiator, said slidable member having a curved face for diverting a portion of heated cooling-medium through one of said lateral ports to said air-heater whence said heated cooling-medium will return by way of the other of said lateral ports to said radiator.

4. In a motor-driven vehicle having an engine fluid-cooling system including an engine cooling-medium jacket and a radiator, and a hot-fluid air-heater for heating the vehicle, the combination with a casing positioned between the jacket and radiator and having a direct passage therethrough permitting direct flow of cooling-medium from said jacket to said radiator, of lateral ports in said casing, conduits connected with said lateral ports and having their opposite ends connected, respectively, with an intake and a discharge of said air-heater, a member slidable in said casing to be moved into said direct passage to divert a portion of heated cooling-medium through one of said lateral ports to said air-heater whence said heated cooling-medium will return by way of the other of said lateral ports to said radiator, a stem secured to said slidable member and extending without the casing, and a sleeve upon said stem and within the casing to limit movement of said slidable member.

In witness whereof I have hereunto set my hand this 19th day of December, 1927.

ORVILLE S. CAESAR.